United States Patent [19]

Burnham et al.

[11] 4,103,304

[45] Jul. 25, 1978

[54] DIRECTION LOCATING SYSTEM

[75] Inventors: Fred E. Burnham, Silver Spring; William H. Clark, College Park, both of Md.

[73] Assignee: Litton Systems, Inc., College Park, Md.

[21] Appl. No.: 352,892

[22] Filed: Apr. 20, 1973

[51] Int. Cl.² .............................................. G01S 3/48
[52] U.S. Cl. ................................ 343/113 R; 343/853
[58] Field of Search ............. 343/113 R, 100 SA, 853

[56] References Cited

U.S. PATENT DOCUMENTS

| | | | |
|---|---|---|---|
| 3,286,224 | 11/1966 | Zefting | 343/113 R |
| 3,295,134 | 12/1966 | Lowe | 343/100 SA |
| 3,474,447 | 10/1969 | MeLancon | 343/100 SA |
| 3,568,203 | 3/1971 | Venters et al. | 343/113 R |

Primary Examiner—Maynard R. Wilbur
Assistant Examiner—Richard E. Berger
Attorney, Agent, or Firm—Alfred B. Levine

[57] ABSTRACT

An instantaneous, omnidirectional direction finding system for locating an incoming wave over a complete 360° arc in space employing a circular antenna array and a fixed phase shifting network for deriving from said array a differently time phase shifted signal for each different spatial direction. The array observes all spatial directions continuously, as opposed to a sequential angular scanning technique. In a preferred system, the phase shifting network provides a plurality of output modes wherein the incoming wave is defined by different phase displaced signals that are compared and quantized to obtain a digital code representing direction.

16 Claims, 6 Drawing Figures

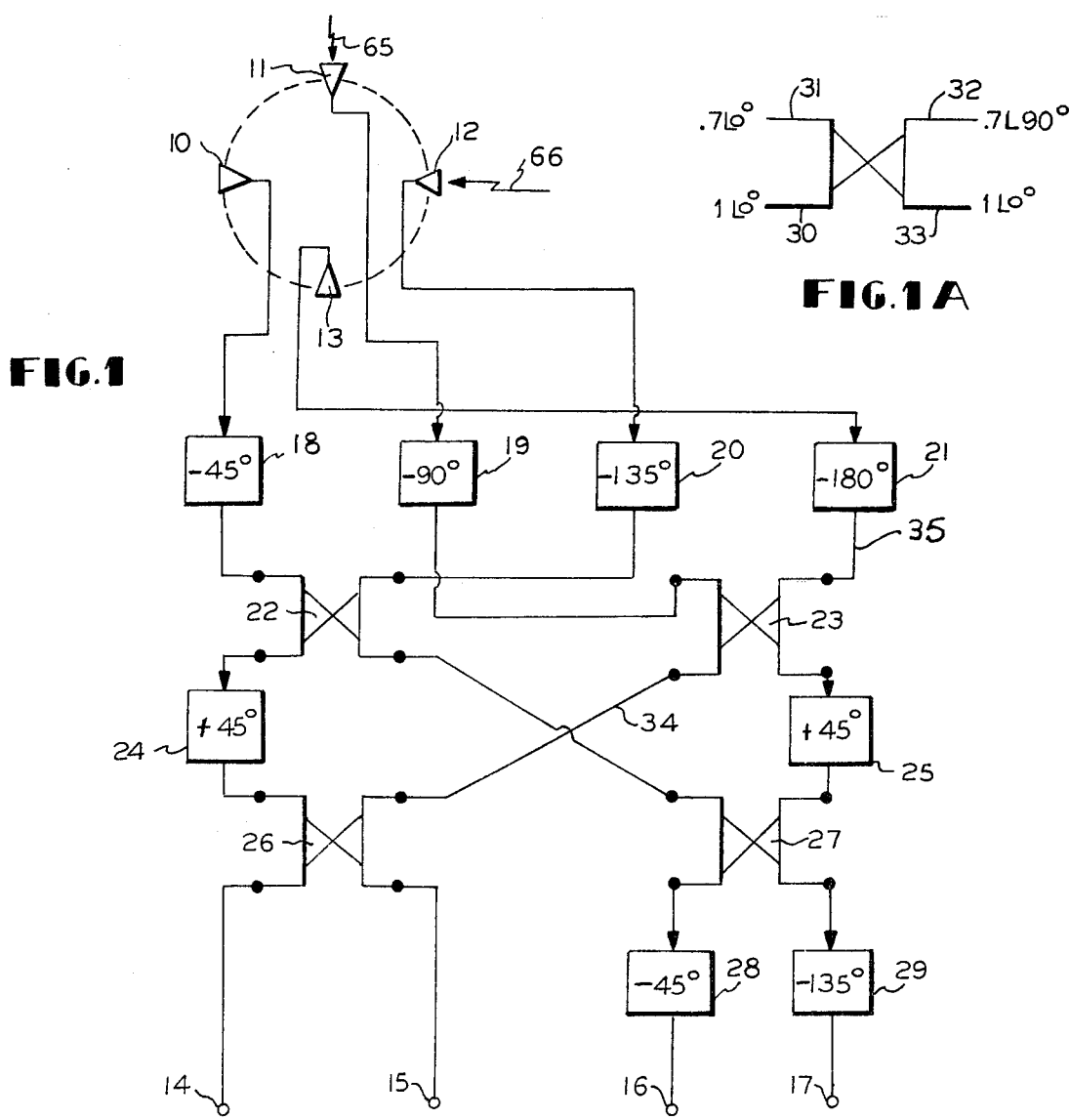
FIG.1
FIG.1A
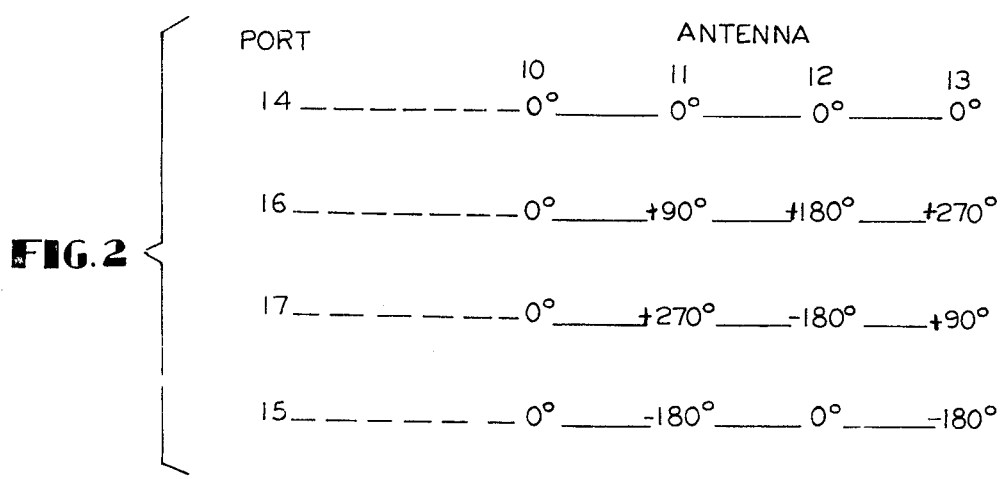
FIG.2

DIRECTION LOCATING SYSTEM

BACKGROUND OF THE INVENTION

1. Field of Invention

This invention generally relates to passive direction locating antenna systems for radio waves, and is particularely concerned with circular antenna array systems that continuously observe over a complete 360° arc in space to determine the spatial direction of an incoming wave and produce a digital output code representing the direction.

2. Description of the Prior Art

In the prior art, the spatial direction of an incoming radio wave has been often determined by the use of scanning antenna systems wherein a focused antenna beam is rotated or electrically scanned to sequentially observe each spatial direction and determine the angle or sector where the incoming wave is received. Both mechanical scanning systems using rotating antenna elements and electronic scanning systems using a rotating beam but stationary antenna elements have been used for this purpose.

It is also known in the prior art to use nonscanning linear antenna arrays that locate the spatial direction of an incoming wave by interferometric techniques. However such linear arrays observe over only a limited angular sector, and a series of such scanning arrays are required to observe over a wide arc such as over a complete 360° arc in space for each axis.

SUMMARY OF THE INVENTION

According to the present invention, there is provided an antenna array system that instantaneously and simultaneously observes over a complete 360° arc in space, about each axis, and determines the location of an incoming wave at any spatial angle within its observed arc. Briefly, the system employs a circular antenna array energizing a phase shifting network that produces output signals whose time phase is directly proportional to the spatial angle of an incoming wave. Thus for each different spatial angle of an incoming wave there is produced output signals having a different time phase angle.

The preferred phasing network operates in plural modes, and provides a series of additional output signals, with a second output signal providing a constant phase reference, and a third output signal and other output signals providing a change in phase shift with spatial angle that progressively varies in a direction opposite to that provided by the first signal, and/or provides a greater or lesser change in phase shift with spatial angle.

To supply improved resolution, or in other words, to define the spatial angle or space direction within narrower angular sectors, more elaborate feed networks may be employed together with a greater number of antenna elements in the array.

BRIEF DESCRIPTION OF THE DRAWINGS

FIG. 1 is a schematic illustration showing a four element circular antenna array and a network comprising a modified "butler" type feed matrix.

FIG. 1A is a schematic illustration of a directional coupler employed in FIG. 1, FIG. 2 is a tabulated chart illustrating the time phase interconnection of each port of the network with the different antennas of FIG. 1.

DESCRIPTION OF A PREFERRED EMBODIMENT

Figure 3:
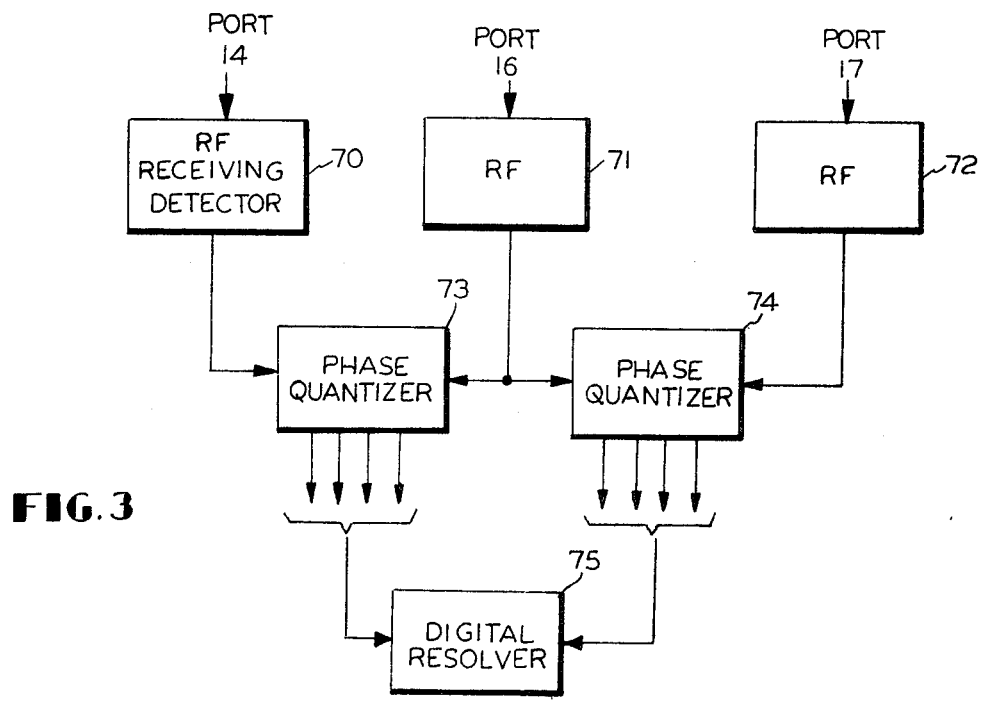
FIG. 3 is a diagrammatic representation of the circuitry for processing the signals obtained from the network of FIG. 1.

Referring to FIG. 1, there is shown a circular antenna array including four spaced antenna elements 10, 11, 12 and 13 disposed in a loop or circular arc to continuously observe outwardly about a full 360° arc in space. This array is fed by a modified "Butler" type matrix having four outlet ports 14, 15, 16, and 17.

This preferred matrix is characterized by simultaneously interconnecting each of the output ports to all of the antennas with a uniquely different fixed time phase interconnection between each port and each of the different antenna elements. Thus, the time phase of a signal received at a given port uniquely reflects that one of the antennas receiving the incoming radio wave; and since each of the antennas are oriented at a different spatial angle, the time phase of the signal received at the given port uniquely defines the spatial direction of the incoming wave.

For example, where an incoming radio wave 65 is arriving from the North it is primarily received by antenna 11, and the fixed time delay of a received signal produced in passing through the network from antenna element 11 to an output port 16, signifies at port 16 that the beam has been received from the North by antenna 11. Similarly, if a radio wave 66 arrives from the East it is primarily received by antenna 12; from the South by antenna 13; and from the West by antenna 10. In each case the phase delay of the signal received at output port 16 differs according to the direction or spatial angle of the radio beam and accordingly indicates the spatial direction of the beam.

Since all of the output ports of the network are continuously connected to all antenna elements through the phase shifting network, each output port provides a unique time phase shifted signal for each different spatial angular sector of the incoming beam referenced to the array. Thus where a beam is received at a spatial angle intermediate a pair of antennas, or is simultaneously received by more than one antenna, the time phase shifted signals resulting from the plural antenna elements are vectorally combined in the network to provide a unique phase signal at the output port representing the spatial angle of the beam referenced to the antenna array.

To prevent feedback or interference at the inputs between the various antenna elements in the array, and also between the different output ports, the preferred network also provides electrical isolation between the different antenna elements or probes, and also provides electrical isolation between the different output ports of the network. The preferred network shown is also characterized by providing a very low loss in power in the transmission of signals to and from each of the antennas to the ports.

According to a preferred embodiment, it is desired to provide an antenna system that simultaneously observes omnidirectionally in space over a full 360° arc, by use of the four or more antenna elements, and provide output signals that are progressively time phase displaced at different angles in direct linear proportion to the different spatial angles of an incoming beam referenced to the array. In one embodiment this is provided by a modified Butler matrix as shown in FIG. 1 that provides different fixed phase relationships between each of three output probes 14, 16, and 17 with respect to each the four antenna elements 10, 11, 12 and 13 as is tabulated in FIG. 2.

More specifically as shown in FIG. 2, the output port 16 is interconnected to reference antenna element 10 by the matrix to provide a 0° time phase displacement therebetween; and progressing clockwise, port 16 is interconnected to antenna 11 to provide a 90° phase shift; with antenna 12 to provide a 180° phase shift; and with antenna 13 to provide a 270° phase shift. To provide a zero phase reference, a second output port 14 is coupled to all four antennas 10, 11, 12 and 13 with a 0° phase interconnection to all antennas. Consequently the incoming spatial direction of the radio beam referenced to the array may be determined by comparing the time phase of the signal appearing at output port 16 with the zero phase reference signal at output port 14.

It has been found that the phase progression or change in phase angle appearing at the output port 16 is not linearly proportional to the changes in spatial angle of the radio beam as a result of the pattern produced by the antenna elements. To correct for this nonlinear relationship, the network provides an additional output at port 17 that changes in time phase angle with the beam spatial positions in an opposite manner than that produced at output port 16. The difference between the two output signals at ports 16 and 17 has been found to provde a signal that changes in time phase linearly at twice the rate in proportion to the spatial angle of the incoming radio beam.

Returning to FIG. 2, it is seen that output port 17 is coupled to antenna 10 through a zero fixed phase delay; port 17 is coupled to antenna 11 with a −90° degree phase delay; is coupled to antenna 12 with a −180° phase delay; and is coupled to antenna 13 with a −270° phase delay. Thus as the incoming radio beam is received at different spatial angles in the clockwise direction (e.g. moving from antenna 10 to 11 to 12 to 13), the time phase delay of the signal at output port 16 changes in a counterclockwise direction from 90°, to 180° to 270°, whereas the time phase delay of the signal at output port 17 changes in a clockwise direction from −90° to −180° to −270°. The difference, or algebraic sum, of the two signals has been found to produce a linear change in phase with beam spatial angle that is twice as great as the change obtained from either port 16 or 17 by itself.

Returning to FIG. 1 for a detailed consideration of the preferred modified "Butler" type matrix, there is provided four fixed phase shifters 18, 19, 20, and 21 with each disposed in a line leading to a different one of the antenna elements. The output lines of phase shifters 18 and 20 are interconnected by a directional coupler 22 to prevent feedback therebetween; and the output lines of phase shifters 19 and 21 are interconnected by a second directional coupler 23 for the same purpose.

In a similar manner, the output ports 14 and 15 are coupled into the matrix through a directional coupler 26 to prevent feedback therebetween, as are output ports 16 and 17 coupled by directional coupler 27. The directional couplers 26 and 27, are in turn, interconnected to directional couplers 22 and 23 with their outside lines passing through phase shifters 24 and 25.

As well known in the art, and generally illustrated in FIG. 1A, the preferred directional couplers employed herein are characterized by electrically isolating the inputs thereto from one another, and isolating the outputs from one another but by coupling both inputs to both outputs. As best illustrated in FIG. 1A, a signal at input line 30 is coupled without change of phase, but at diminished amplitude, to output line 31 and is also coupled across the directional coupler to output line 32 with a fixed 90° phase change and the same diminished amplitude. Similarly a signal on second input line 33 is coupled on the same side to output line 32 without phase change, but coupled across the directional coupler 11 to output line 31 with a 90° degree phase change.

With this mode-of-operation in mind, it is seen that reference output port 14 undergoes a fixed +90° phase change when passing across coupler 26 to line 34 and a second +90° phase change when passing across coupler 23 to line 35. This +180° phase displacement is nullified by fixed phase shifter 21, providing a negative −180°, so that output port 14 is coupled to antenna element 13 without net phase change. In a similar manner it will be seen that output port 14 is coupled to each of the other antenna elements without phase change to any antenna. This is as shown in the first row of FIG. 2.

In similarly tracing through each of the interconnections between output port 16 and the antenna elements 10, 11, 12, and 13, it will be seen that the network provides the progressive time phased relationships therebetween as is tabulated in FIG. 2. More specifically, outlet 16 is interconnected to antenna 10 with a 0° phase shift; to antenna 11 with a 90° shift; to antenna 12 with a 180° degree shift; and to antenna 13 with a 270° degree shift.

Similarly, it will be seen by tracing the connections between output port 17 and each of antenna elements 10, 11, 12, and 13 that an opposite phase progression is obtained than that occuring at port 16. Thus where the time phase of the signal appearing at port 16 may be phase advanced by 90° degrees (when the radio signal 65 is received from due north by antenna 11), then the time phase of the signal appearing at output port 17 will be delayed by 90° degrees.

Briefly recapitulating, the four antenna elements are disposed in a circular array to observe over a full 360° spatial arc and all four antenna elements are continuously in communication with three output ports 14, 16, and 17 through a modified BUTLER type matrix. The phase relationship interconnecting a first output port 14 of the matrix with all antenna elements is 0° degrees so that regardless of the spatial direction of the incoming radio wave, the phase of the received signal at port 14 is 0° to serve as a reference. A second output port 16 is also continually connected to all antenna elements but with a different fixed time phase relationship to each element that progressively changes from antenna element-to-element, e.g. 0°, 90°, 180°, and 270°. Thus for each different spatial direction of a received radio wave referenced to the antenna array, a differently time phase shifted signal is received at port 16 that identifies the spatial direction.

Consequently the difference in time phase between the signal received at output port 16 compared to the signal at reference port 14 serves to identify the spatial direction of the radio wave.

To obtain a linear time phase change at the output ports with the spatial direction change of the incoming radio wave, an opposite phase progression change is produced at a third output port 17 that changes in phase in a direction opposite to that occuring at port 16. Therefore the difference between the time phases of the signals at ports 16 and 17 produces a linear change of phase output with spatial direction, and at twice the rate of change of phase than at either port 16 or 17 by itself.

FIG. 3 illustrates a preferred circuit for generating a digital output signal representing direction that changes in a linear manner with change in spatial direction of the radio beam. As shown, the radio frequency output signals from each of ports 14, 16, and 17 are initially directed to RF receivers and detectors, 70, 71, and 72, respectively to remove the RF carrier signals. The detected signal from port 16 whose time phase represents space direction, is compared with the zero phase reference signal signal from port 14 in a phase comparator and digital quantizer 73, and a first multibit digital code is produced that identifies space direction. Concurrently, the detected phase signal from port 16 is compared in phase with the oppositely changing phase signal from port 17 in quantizer 74 and a second multibit digital code is produced proportional to twice the phase change. The first and second digital codes are then applied to a digital resolver 75 that provides an extended multibit digital code serving to accurately reflect the space direction in a manner that is linearly related to the angle of space direction of the incoming radio wave referenced to the antenna array.

It will be appreciated by those skilled in this art that all elements employed may be reciprocally functioning devices that either transmit or receive signals. Accordingly by applying properly phased input signals to the ports 14, 16, and 17, the antenna array will produce and propogate waves outwardly from the array at different spatial angles in proportion to the time phase of applied input signals.

Figure 4:
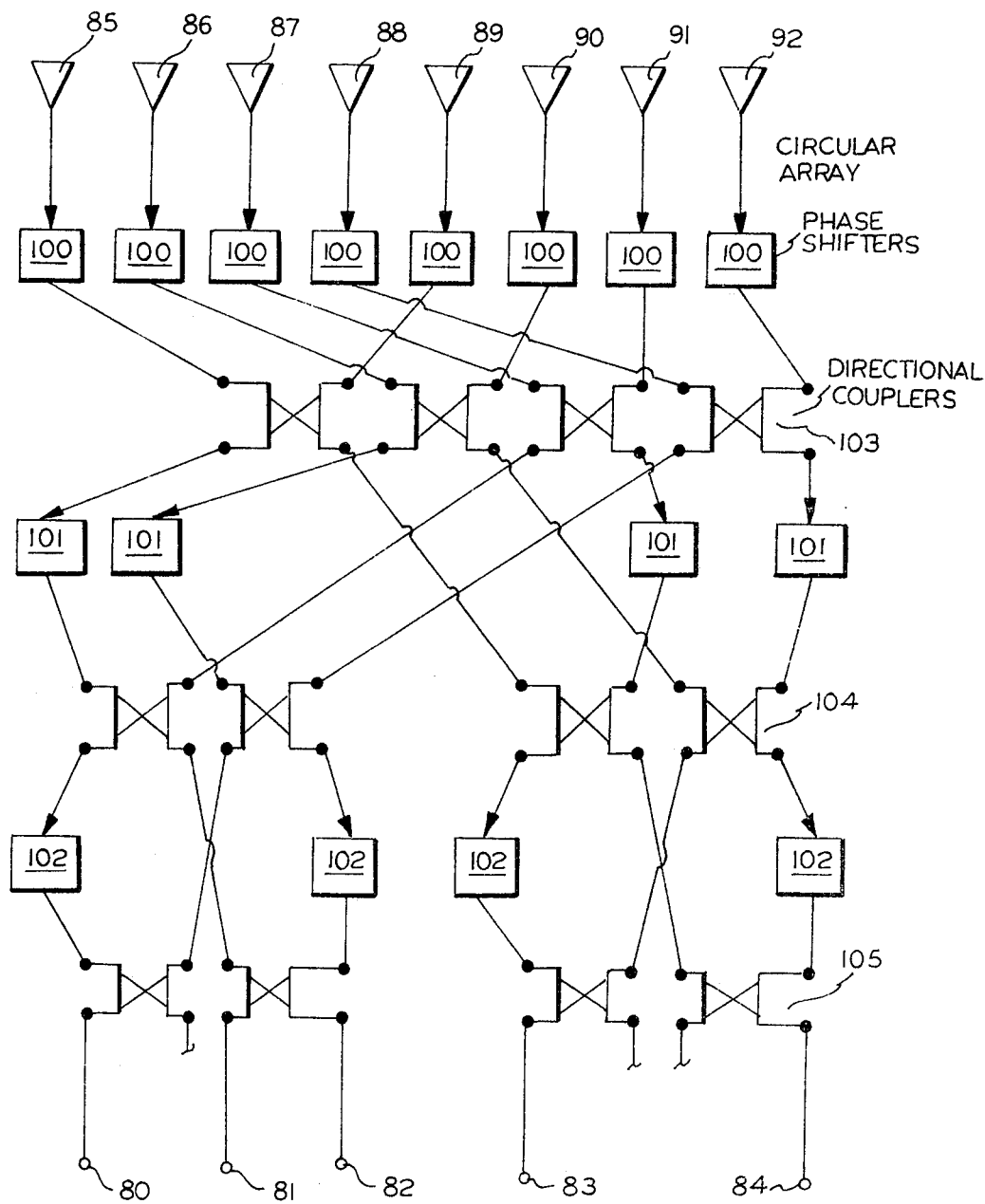
FIG. 4 is an illustration of an eight element antenna system and interconnecting network.

The resolution of the direction finding system may be increased by increasing the number of the antenna elements in the array and proportionately the complexity of the BUTLER type matrix. For example, eight element antenna arrays, 16 element arrays, 32 element arrays, and others may be employed depending upon the resolution desired, the frequency of operation, and the physical size of the elements. An eight element array provides additional signals at output ports having twice as great a phase change with change in space angle as a four element array, and a block diagram illustrating such a system is shown in FIG. 4. In the same general manner as previously described, each of the output ports 80, 81, 82, 83, and 84 are coupled to all of the antenna elements 85 to 92 using a modified Butler matrix employing layers of directional couplers 103, 104, and 105 and fixed phase shifters 100, 101, and 102; as shown. Output port 80 serves as a reference and provides a fixed phase signal regardless of the space angle of the radio wave. Ports 83 and 84 are coupled to all antenna elements with a progressively different phase relationship to each element in the same general manner as was previously described in connection with FIG. 1. These ports accordingly provide a pair of oppositely changing phase signals that each vary in phase from 0° to 360° as the space angle varies over a 360° spatial angle. The ports 81 and 82, on the other hand, provide a pair of progressively oppositely changing phase signals that each vary from 0° to 720° in phase as the space angle of the wave changes over a 360° space angle.

Where the phase change of an output port varies over a range of $4\pi$ or 720° with variation of the spatial direction of the beam of 360° than an error in the output of 10° in phase represents an error in determining space angle of only 5°. Similarly where a still greater number of antenna elements are used in the array to provide a phase change at the output of $8\pi$ or 1440° in phase with space angle change of 360°, then a 10° error in phase represents only a 2.5° error in determining space angle.

Figure 5:
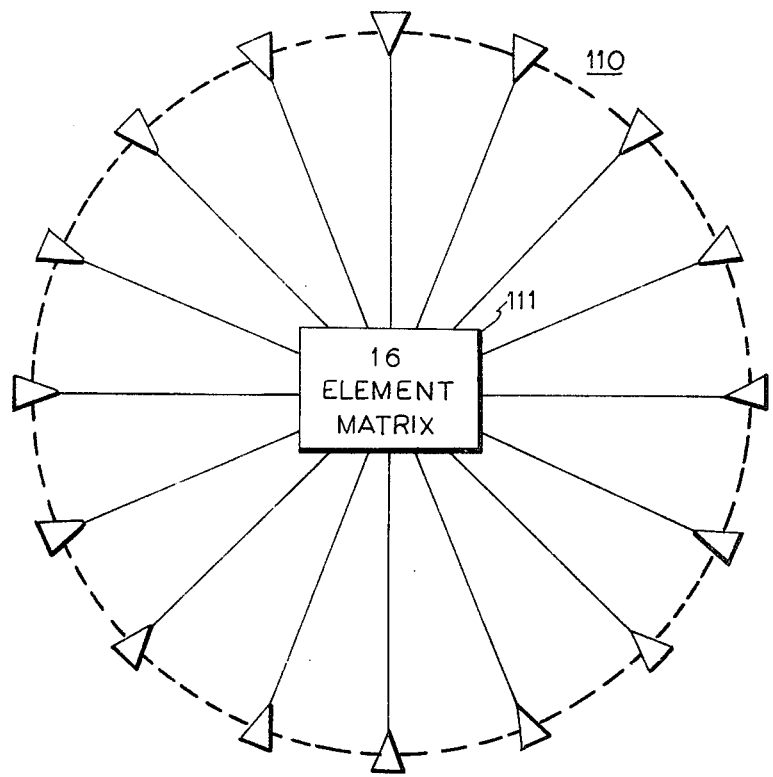
FIG. 5 is a schematic diagram illustrating a system employing a sixteen element circular antenna array.

For an 8 element array, it has been found that with the antenna elements spaced apart by one half wavelength, that the phase errors were reasonable, with the greatest error in the range of about 4°. With a sixteen element array, as schematically shown in FIG. 5, the accuarcy is much greater and with given antenna elements spaced apart at about 0.6 of the wavelength, the maximum space error was about 1.8°. For a thirty-two element antenna array (not shown), the maximum space error was found to be less than 0.5.

The frequency band that may be employed with a given system is essentially determined by that of the antenna elements. For conventionally available antennas, the useful frequency band is generally an octave. However, multi-octave coverage may be obtained by using smaller antenna elements with some penalty of reduced gain.

The modified "Butler" type matrix may be constructed in a wide frequency range between essentially DC to 18 $GH_z$ employing the present state of the art. At the lower frequencies, wire wound ferrite core hybrids may be employed, while at the higher frequencies, stripline coupler and phase shifters are preferably used.

Since many changes may be made by those skilled in this art without departing from the spirit and scope of this invention, this invention should be considered as being limited only by the following claims.

What is claimed is:

1. In an instantaneous direction finding system for determining the spatial direction of an incoming wave,
    an arcuately disposed antenna array of elements for observing over an extended arc in space,
    a network means having plural outputs, and plural inputs continuously coupled to plural elements of said array to provide at one of the outputs a progressively different time phase displaced signal for each different spatial direction of an incoming wave,
    said network providing at a different output a second signal that differs in time phase from that produced for each different spatial direction of the wave,
    and means comparing the signal and second signals, to determine the spatial direction of an incoming wave referenced to said array.

2. In the system of claim 1, said second signal providing a like time phase for each different spatial direction of said incoming wave, thereby providing a reference signal.

3. In the system of claim 1, said second signal providing a progressively different time phase for each spatial direction of an incoming wave that oppositely changes in phase with spatial direction from the first mentioned signal.

4. In the system of claim 3, said network providing a third signal having the same time phase for all spatial directions of the incoming wave.

5. In the system of claim 4, the addition of means providing an output signal that changes in time phase with spatial direction at a greater rate than that produced by said signal and second signal.

6. In the system of claim 5, a plurality of digital resolvers responsive to said network signals to precisely define the spatial angular direction of said incoming wave by a digital code.

7. In the system of claim 6, said network having a plurality of ports and a modified Butler type matrix continuously coupling said plural antenna elements to each of said ports; said Butler type matrix including a plurality of directional couplers interconnecting each pair of ports and each pair of antenna elements to provide isolation therebetween.

8. In an instantaneous direction finding system for determining the spatial direction of an incoming wave.
an arcuately arranged antenna array for continuous omnidirectional observation,
a reciprocal feed network means coupled to all positions of said array to provide at a first output a different time phase displaced signal for each different angular position of an incoming wave in space,
said network means coupled to said array to provide at a second output a different time phase displaced signal for each different spatial direction of an incoming wave,
and phase quantizing means for comparing the signals at the first and second outputs to provide a digital code corresponding to the spatial angle of the wave.

9. In the system of claim 8, said network means coupled to said array to provide at a third output a signal that differs in time phase with spatial direction from the signals obtained from both of the first and second outputs, and additional phase quantizing means for comparing the third output signal with one of the first and second output signals to obtain an additional directional code, and still an additional resolver for responding to the directional code and additional directional code to more precisely define the spatial direction of the incoming wave.

10. An instantaneous direction finding system comprising:
an antenna having a plurality of elements disposed in an arcuate array,
a plurality of ports,
a network means coupling said ports to said antenna elements with each port continuously coupled to all elements,
said network electrically isolating the antenna elements from each other and electrically isolating the ports from each other,
said network means including phase shifting means for coupling one of said ports to said antenna elements to provide a progressively different time phase interconnection between that port and each different antenna element,
said network means coupling a second port to said same antenna elements to provide a different phase relationship with each said element that differs in phase than the interconnection with said first port,
and means comparing the phase relationship of signals from said first and second ports to determine spatial direction of an incoming wave referenced to said antenna array.

11. In the system of claim 10, said antenna array disposed in a loop to observe over a full 360° in space,
said network means coupling said first port to said array to provide a progressively different time phase shift proportional to each different spatial angle of a incoming wave referenced to said array,
and said network means coupling said second port to said array to provide a progressively different time phase shift at said second port that is proportional to each different spatial angle of an incoming wave, but progressively changing with spatial angle in a reverse manner to that at said first port.

12. In the system of claim 11, said network means comprising a "Butler" type matrix having a plurality of directional couplers equal in number to the number of elements in said array to provide isolation between the antenna elements and between the ports.

13. A direction locating system comprising:
a plurality of antenna elements disposed in an arcuate array,
and a reciprocal network means for simultaneously interconnecting all of said antennas to a first and second junction while isolating each antenna element from the others and isolating said first and second junction from each other,
said network being characterized by simultaneously and continuously interconnecting one of said junctions to all antenna elements with a different fixed time phase relationship to each, and simultaneously and continuously interconnecting each antenna element with the other junction with a known different predetermined time phase relationship to each, and means comparing the phase of the outputs from the first and second junctions,
whereby each different spatial direction of a radio wave referenced to said array produces a different time phase signal at said first junction referenced to said second junction.

14. In the direction finding system of claim 13, the different fixed time phase interconnection between one of said junctions and all antenna elements progressively increasing in phase according to the spatial angle of observation of said element.

15. In the system of claim 12, the time phase interconnections between said other junction and all antenna elements progressively decreasing in phase according to the spatial angle of observation oppositely to that of said one junction, whereby the phase difference between said one junction and other junction progressively changes in a linear manner with changes in spatial direction of an incoming wave referenced to said array.

16. In the system of claim 12, said other junction being interconnected with all of said antennas in the same time phase relationship.

* * * * *